(12) United States Patent
Chapier et al.

(10) Patent No.: US 9,703,727 B2
(45) Date of Patent: Jul. 11, 2017

(54) METHOD OF SECURE MANAGEMENT OF A MEMORY SPACE FOR MICROCONTROLLER

(71) Applicant: Schneider Electric Industries SAS, Rueil-Malmaison (FR)

(72) Inventors: Pascal Chapier, Valbonne (FR); Patrice Jaraudias, Biot (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 108 days.

(21) Appl. No.: 14/382,674

(22) PCT Filed: Apr. 4, 2013

(86) PCT No.: PCT/EP2013/057117
§ 371 (c)(1),
(2) Date: Sep. 3, 2014

(87) PCT Pub. No.: WO2013/156315
PCT Pub. Date: Oct. 24, 2013

(65) Prior Publication Data
US 2015/0032976 A1    Jan. 29, 2015

(30) Foreign Application Priority Data
Apr. 18, 2012 (FR) .................... 12 53553

(51) Int. Cl.
*G06F 12/14* (2006.01)
*G06F 12/10* (2016.01)
(Continued)

(52) U.S. Cl.
CPC ........ *G06F 12/145* (2013.01); *G06F 12/1036* (2013.01); *G06F 12/1491* (2013.01);
(Continued)

(58) Field of Classification Search
USPC .......................................... 711/152
See application file for complete search history.

(56) References Cited

U.S. PATENT DOCUMENTS 5,287,521 A * 2/1994 Nitta ...................... G06F 9/526
  707/999.008
5,852,747 A * 12/1998 Bennett ............. G06F 17/30171
  707/E17.007
(Continued)

FOREIGN PATENT DOCUMENTS

EP    1 331 539    7/2003

OTHER PUBLICATIONS

Patricia J. Teller, "Translation-Lookaside Buffer Consistency", Computer, vol. 23, No. 6, pp. 26-36, (Jun. 1, 1990) XP00017373.*
(Continued)

*Primary Examiner* — Charles Rones
*Assistant Examiner* — Sidney Li
(74) *Attorney, Agent, or Firm* — Oblon, McClelland, Maier & Neustadt, L.L.P.

(57) ABSTRACT

A method of managing an electronic microcontroller system, the microcontroller system including: two processors with a first processor configured for execution of a nonsecure application exhibiting a nonguaranteed level of functional security and integrity, and a second processor dedicated to execution of a secure application implementing code and data, and involving a guaranteed level of functional security and integrity, the secure application to implement a security function; and a mechanism to access to a shared memory space. The first processor includes a unit for managing the memory configured to implement a write access control, to manage write access to the shared memory space, that is not modifiable when the secure application implements its security function.

4 Claims, 2 Drawing Sheets

(51) Int. Cl.
*G06F 21/64* (2013.01)
*G06F 21/74* (2013.01)
*G06F 21/79* (2013.01)
*G06F 13/00* (2006.01)
*G06F 13/28* (2006.01)
*G06F 12/1036* (2016.01)

(52) U.S. Cl.
CPC .............. *G06F 21/64* (2013.01); *G06F 21/74* (2013.01); *G06F 21/79* (2013.01); *G06F 2221/2147* (2013.01)

(56) References Cited

U.S. PATENT DOCUMENTS

| | | | | |
|---|---|---|---|---|
| 5,892,954 | A * | 4/1999 | Tomas | G06F 17/30171 707/E17.007 |
| 5,933,825 | A * | 8/1999 | McClaughry | G06F 11/1435 |
| 7,222,119 | B1 * | 5/2007 | Ghemawat | G06F 17/30171 |
| 7,457,880 | B1 * | 11/2008 | Kim | G06F 17/30171 709/216 |
| 8,086,585 | B1 * | 12/2011 | Brashers | G06F 17/30097 707/705 |
| 8,666,957 | B2 * | 3/2014 | Srivastava | G06F 17/30171 707/704 |
| 8,954,409 | B1 * | 2/2015 | Kerem | G06F 17/30348 707/704 |
| 9,213,717 | B1 * | 12/2015 | Pawar | G06F 17/30171 |
| 2003/0140244 | A1 | 7/2003 | Dahan et al. | |
| 2003/0140245 | A1 | 7/2003 | Dahan et al. | |
| 2004/0177261 | A1 | 9/2004 | Watt et al. | |
| 2004/0255048 | A1 * | 12/2004 | Lev Ran | G06F 9/546 709/249 |
| 2005/0066095 | A1 * | 3/2005 | Mullick | G06F 17/30171 710/200 |
| 2007/0118880 | A1 | 5/2007 | Mauro | |
| 2007/0226795 | A1 * | 9/2007 | Conti | G06F 21/74 726/22 |
| 2008/0052290 | A1 * | 2/2008 | Kahn | G06F 17/30171 |
| 2008/0184365 | A1 | 7/2008 | Matsushita | |
| 2009/0144440 | A1 * | 6/2009 | Subbanna | G06F 17/30171 709/233 |
| 2010/0011037 | A1 * | 1/2010 | Kazar | G06F 3/0605 707/E17.01 |
| 2011/0307449 | A1 * | 12/2011 | Cargille | G06F 11/1435 707/648 |
| 2012/0304171 | A1 * | 11/2012 | Joshi | G06F 9/45558 718/1 |
| 2014/0351231 | A1 * | 11/2014 | McKenney | G06F 17/30171 707/704 |
| 2014/0380009 | A1 * | 12/2014 | Lemay | G06F 12/145 711/163 |

OTHER PUBLICATIONS

Weidong Shi et al. "Architectural Support for High Speed Protection of Memory Integrity and Confidentiality in Multiprocessor Systems" Sep. 29-Oct. 3, 2004, IEEE Proceedings of the 13th International Conference on Parallel Architecture and Compilation Techniques (PACT'04) 1089-795X/04, 12 pages.*
Leandro Fiorin et al. "Secure Memory Accesses on Networks-on-Chip" Sep. 2008, IEEE Computer Society, IEEE Transactions on Computers, vol. 57, No. 9, pp. 1216-1229.*
Patricia J. Teller, "Translation-Lookaside Buffer Consistency", Computer, vol. 23, No. 6, pp. 26-36, (Jun. 1, 1990) XP000173737.
International Search Report Issued Jun. 21, 2013 in PCT/EP13/057117 Filed Apr. 4, 2013, 6 pages.

* cited by examiner

METHOD OF SECURE MANAGEMENT OF A MEMORY SPACE FOR MICROCONTROLLER

TECHNICAL FIELD OF THE INVENTION

The present invention pertains to a method for managing applications exhibiting a high level of integrity and functional security as well as applications not exhibiting any particular criticality, on one and the same microcontroller system.

Thus, the present invention relates to the management of systems that are critical from the point of view of the functional security of the programmable electronic equipment and from the point of view of the integrity, within the framework of the simultaneous operation, on one and the same microcontroller system, of critical applications, termed "safe", and therefore exhibiting a high guaranteed level of integrity and functional security, and non-critical applications, termed "no safe", and exhibiting a non-guaranteed level of integrity and functional security.

PRIOR ART

The systems concerned in the present invention are microcontrollers exhibiting architectures with several processors and the method according to the invention addresses their use in an environment sensitive to problematic issues of functional security and integrity, associated with a general problematic issue of certification of microcontroller systems from the point of view of functional security and integrity. Such certifications are for example named SIL for Safety Integrity Level. Various values of SIL exist, ranging from 1 to 4, from the least secure to the most secure, in particular defined in the "European Functional Safety standards".

Currently, to take into account the problematic issue dealing with the coexistence of secure applications, termed "safe", that is to say involving a high level of integrity and functional security and of non-secure applications, termed "no safe", that is to say not involving a high level of integrity and functional security, the known technologies relate essentially to the notions of virtualization and of hypervisors.

The person skilled in the art possesses in his general knowledge the main characteristics of these technologies. Briefly, it is recalled that virtualization technologies consist of a functional security software mechanism in which a management layer, occupied for example by a hypervisor, exhibiting a very high level of reliability, comprises means for separating independent software platforms running on one and the same processor. To do this, said hypervisor comprises a memory management unit, usually dubbed MMU, making it possible to partition the use of resources, in particular of a memory space, between the various shared applications.

Such a hypervisor may exhibit the capacity to manage the various processors independently; for example, said hypervisor may have the capacity to restart a processor associated with an operating system without restarting the other processors.

By way of illustration of a technology implementing the virtualization techniques mentioned hereinabove, it will be possible to refer to document EP1067461A1. Moreover, documents US2007118880A1 and EP1331539A2 describe systems with several processors in an environment comprising security problems.

However, although it tackles the general problematic issue of managing the coexistence of secure and non-secure applications on one and the same processor, the implementation of a hypervisor exhibits certain drawbacks. Firstly, the use of a hypervisor degrades the performance of a system since this tool consumes resources and gives rise a priori to a slowdown of the system. This may also be detrimental to aspects of "real-time" constraints associated with certain applications, be they secure or non-secure. Moreover, today, this type of equipment exhibits a very high acquisition cost.

Thus, the technical problem aimed at by the present invention can be considered to be the search for means making it possible to manage the coexistence of secure and non-secure applications on one and the same microcontroller system, at reduced costs, therefore while circumventing the known but expensive technologies involving virtualization and hypervisor. Moreover the invention will have a limited impact on the performance of the system.

DISCLOSURE OF THE INVENTION

For this purpose, the subject of the invention is a method of management of an electronic microcontroller system, said microcontroller system comprising:
two processors, with a first processor intended for the execution of a non-secure application, exhibiting a non-guaranteed level of functional security and integrity, and a second processor dedicated to the execution of a secure application, implementing code and data, and involving a guaranteed level of functional security and integrity, said secure application being able to implement a security function;
means of access to a shared memory space.

According to the invention, the first processor comprises a memory management unit configured in such a way that it implements a write-access check, for managing write-access to the shared memory space, non-modifiable when the secure application implements its security function.

Advantageously, the write-access check is rendered non-modifiable by the implementation of the following steps:
the apportionment of the shared memory space between a memory area allocated to the secure application and a memory area allocated to the non-secure application;
the implementation of a buffer for the anticipation of the translation of the addresses;
the loading into said buffer for the anticipation of the translation of the addresses of a set of rules of access to the shared memory comprising a rule prohibiting writing by the non-secure application in a reserved area of the memory area allocated to the secure application;
the copying into the shared memory space of an image of the buffer for the anticipation of the translation of the addresses;
the loading into said image of the buffer for the anticipation of the translation of the addresses of a rule prohibiting writing in the buffer for the anticipation of the translation of the images;
the implementation, by the memory management unit, of the access rules contained in the image of the buffer for the anticipation of the translation of the addresses.

The expression "Buffer for the anticipation of the translation of the addresses" or more simply "address translation Buffer" corresponds to the known usual acronym TLB standing for "Translation Lookaside Buffer", which is a memory of a microprocessor that may be used by a memory management unit in particular to translate virtual addresses into physical addresses.

Advantageously, the method according to the invention can moreover comprise, subsequent to the previous steps, a step consisting of a verification of the integrity of the buffer for the anticipation of the translation of the addresses and of the integrity of the code and of the data corresponding to the secure application.

Advantageously, the method according to the invention can moreover comprise a step of constructing a security CRC, CRC standing for cyclic redundancy check, aimed at detecting errors of transmission or of transfer, said CRC being associated with said buffer for the anticipation of the translation of the addresses.

Advantageously, the method according to the invention can moreover comprise, after each step, a step of verifying the proper progress of the previous action step.

BRIEF DESCRIPTION OF THE FIGURES

Other characteristics and advantages will become apparent in the detailed description which follows offered with regard to the appended drawings which represent.

DETAILED DESCRIPTION OF AT LEAST ONE EMBODIMENT

Figure 1:
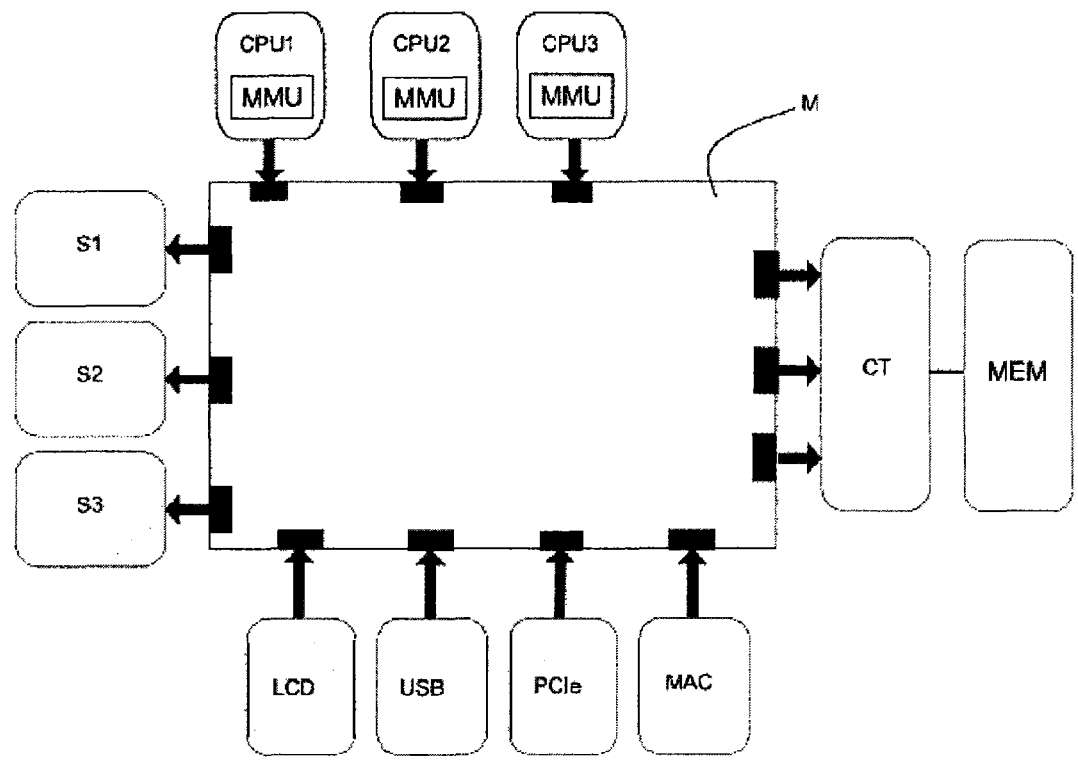
FIG. 1: a functional diagram of an electronic microcontroller system having to manage secure and non-secure applications, termed "safe" and "no safe" respectively.

On the basis of the microcontroller system represented schematically in FIG. 1, the method according to the invention relates to the simultaneous management, in the microcontroller system, of secure applications, that is to say exhibiting a level of functional security and integrity which is at one and the same time guaranteed and high, and of non-secure applications, that is to say exhibiting a non-guaranteed security level.

FIG. 1 represents an electronic microcontroller system with three micro-processors CPU1, CPU2, CPU3. In this system, each processor comprises means of access to the shared memory through the memory management units MMU.

The microcontroller system interacts moreover with a shared memory space MEM by way of a memory controller CT, and checks functions implemented by slave peripherals S1, S2, S3, for example serial link interfaces, SDCARD memory board or compactFlash interfaces, not having any active role, that is to say not taking the initiative of using the microcontroller system.

Finally, the microcontroller system is invoked by user master peripherals linked to it by way of dedicated interfaces; these LCD, USB, PCIe, MAC master peripherals may have the initiative to use the resources of the microcontroller. In particular, said user master peripherals may be peripherals corresponding to standards, for example LCD (Liquid Crystal Display) screens, USB (Universal Serial Bus) peripherals, from the name of the well-known standard relating to a serial transmission computer bus, PCIe, or PCI Express (Peripheral Component Interconnect Express) expansion boards, from the name of the known standard allowing the connection of expansion boards to a motherboard, or else MAC Ethernet boards for connection to a network.

The interconnection matrix M effects the interconnection between said processors CPU1, CPU2, CPU3, the shared memory space MEM, via the memory controller CT, the LCD, USB, PCIe, MAC user master peripherals, via the dedicated interfaces, and the slave peripherals S1, S2, S3.

The method according to the invention confers the means for making secure applications and non-secure applications operate at one and the same time on one and the same microcontroller system, of the type of that presented in FIG. 1, in particular through a particular use of memory management units MMU bound to each of the processors CPU1, CPU2, CPU3. This particular use of the memory management units MMU guarantees that no non-secure application can undermine the integrity of an area of the shared memory space MEM used by a secure application during execution of a security function.

Moreover, when, through this particular use of the memory management units MMU, the integrity of the area of the shared memory space MEM used by a secure application is guaranteed, the system may be considered as operating, overall, in secure mode, termed "safe". In the converse case, as soon as the integrity of the area of the shared memory MEM used by the secure application is not guaranteed, the system will be considered as operating, overall, in a non-secure maintenance mode.

Figure 2:
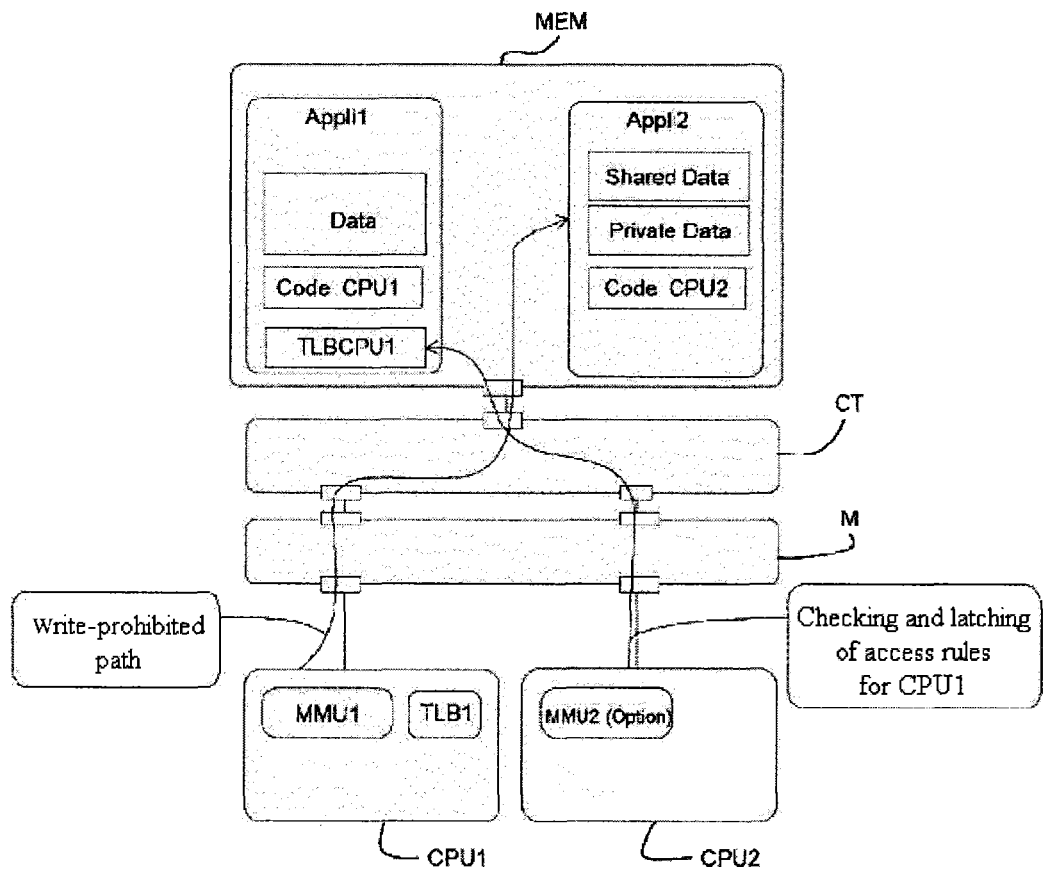
FIG. 2: an exemplary embodiment of the method according to the invention, implementing a memory management unit for a non-secure application, which guarantees memory isolation in relation to a secure application.

An exemplary use of such memory management units MMU is presented in FIG. 2.

Thus, FIG. 2 depicts an apportionment of two applications, Appli1 and Appli2 in the shared memory MEM. The non-secure application Appli1 is executed by the first processor CPU1, it is developed around a standard operating system customarily used in the industry, for example VxWorks Linux, conferring real-time execution characteristics on the application Appli1 but not offering any capacity to receive a certification in respect of the functional security of the industrial equipment which implements it. The secure application Appli2, executed by the second processor CPU2, is entirely developed according to a process of definition, production and testing designed to enable a functional security certification to be obtained.

The microcontroller system could of course comprise other processors, in particular a third processor charged with executing a third application of non-secure type, for example in order to carry out a communication function, but this is not shown diagrammatically in FIG. 2. Other processors dedicated to the execution of other secure applications could also be present.

A first memory management unit MMU1 attached to the first processor CPU1 implements a driver executing specific method steps, so as to guarantee the isolation of the memory space shared between the applications, as it must not be possible for the non-secure applications to undermine the integrity of the data associated with secure applications.

The protection principle is aimed at securing the function of filtering of the first memory management unit MMU1, bound to the first processor CPU1 which executes the non-secure application Appli1, so as to guarantee the prohibition of writing in the area of the shared memory MEM allocated to the secure application Appli2. A memory management unit MMU2, bound to the second processor CPU2, is optional; its use is not bound to the protection principle described hereinabove.

In a conventional use, the driver of the first memory management unit MMU1, belonging to the non-secure application Appli1, implements an address translation buffer TLB1 for the translation of the addresses which the first processor CPU1 seeks to access into addresses of the shared memory MEM. This address translation buffer TLB1 dictates the rules of access of the first processor CPU1 to the shared memory MEM through the first memory management unit MMU1. In this conventional use, the address translation buffer TLB1 is constructed by the non-secure application Appli1 subsequent to the execution of the driver of the first memory management unit MMU1; the latter consequently cannot guarantee the filtering of the accesses for writing in the area of the shared memory MEM dedicated to the secure application Appli2. The conventional use of the first memory management unit MMU1 does not satisfy the execution of secure and "non safe" applications on one and the same microcontroller system such as defined in FIG. 1.

A particular method utilizing the first memory management unit MMU1 is described through the present invention. This particular use consists in rendering the content of the address translation buffer TLB1 checked and then latched by the secure application Appli2 so as to guarantee the filtering of the writes which is performed by the first memory management unit MMU1. The secure application Appli2 can then ensure a security function provided that the check regarding the content of the address translation buffer TLB1 is satisfied. The item of equipment integrating the microcontroller system considered will then be able to be considered as operating, overall, in secure mode, termed "safe".

The principle of latching of the address translation buffer TLB1 relies on an action for blocking write-accesses to the shared memory area MEM which contains an image TLB-CPU1 of the address translation buffer TLB1. The first memory management unit MMU1 operates in a manner such that it always uses the access rules contained in the image TLBCPU1 of the address translation buffer TLB1.

A possible sequence for the construction, the checking and then the latching of the rules of access of the first processor CPU1 to the shared memory MEM is described hereinafter. Other sequences leading to the same result are possible without departing from the scope of the invention.

Step 1 is a step of defining the organization of the shared memory MEM. The location of the image TLBCPU1 of the address translation buffer TLB1 is defined and known by the non-secure application Appli1 and the secure application Appli2. An area of the shared memory MEM is reserved to contain executable code arising from the secure application Appli2; this area is referenced "Code CPU2" in FIG. 2. An area of the shared memory MEM is reserved to contain the private data of the secure application Appli2; this area is referenced "Private Data" in FIG. 2. The data being shared by the secure application Appli2 for a read-access by the non-secure application Appli1 have a location known to both applications, non-secure Appli1 and secure Appli2; these data being shared are referenced "Shared Data" in FIG. 2.

An area of the shared memory MEM is moreover allocated to the non-secure application Appli1, comprising an area "Code CPU1" for the executable code and an area "Data" for the associated data.

Step 2 corresponds to the starting of the item of equipment, or to the initialization of the item of equipment, comprising the microcontroller system charged with implementing the non-secure application Appli1 and the secure application Appli2. The non-secure application Appli1, by way of the execution of the driver for initializing the first memory management unit MMU1, constructs the address translation buffer TLB1. At this juncture the secure application Appli2 does not yet ensure any security function, standing by waiting for the non-secure application Appli1 to finish constructing the address translation buffer TLB1. Provision may be made, in the course of step 2, for the construction of a security CRC, CRC standing for cyclic redundancy check, checked by the non-secure application Appli1, to detect the end of the construction and of the initialization of the address translation buffer TLB1 and to go to step 3.

Step 3 corresponds to the latching of the address translation buffer TLB1. A preferred means for implementing this step 3 is to activate a function of the first memory management unit MMU1 consisting in configuring the write-prohibition in respect of the addresses in shared memory MEM corresponding to the image TLBCPU1 of the address translation buffer TLB1.

Step 4 corresponds to the validation of the content of the address translation buffer TLB1. This step 4 is dedicated to the secure application Appli2. Thus, the secure application Appli2 verifies that the rules contained in the image TLB-CPU1 of the address translation buffer TLB1 correspond to the definitions aimed at in step 1.

Step 5 corresponds to the operation in "safe" mode of the microcontroller system and of the item of equipment with which it is integrated. The secure application Appli2 then fulfills its security function, and the non-secure application Appli1 cannot undermine the integrity of the code and of the data of the secure application Appli2. The secure application Appli2 must moreover preferably periodically perform the verification of the integrity of the code and of the data which are associated therewith.

To summarize, the method according to the invention comprises the means for ensuring the secure management of secure and non-secure applications on one and the same microcontroller system, in particular by way of the particular implementation of a unit for managing the secure memory, situated at the level of the operating system of the processor executing said non-secure applications.

Advantageously, with a view to obtaining a functional security certification for an industrial item of equipment integrating such a microcontroller system, the certification of the first memory management unit MMU1, implementing the method according to the invention, may turn out to be a sufficient condition to be fulfilled in respect of the criterion of memory isolation between secure and non-secure applications.

The invention claimed is:

1. A method of management of an electronic microcontroller system for ensuring a check of write-access rendered non-modifiable, the microcontroller system including:
   a first processor configured to execute a non-secure application, and
   a second processor configured to execute a secure application that implements a security function,
   the first and second processors configured to access to a shared memory space, and
   the first processor configured to implement the check of write-access, and to manage write-access to the shared memory space that is non-modifiable when the secure application implements the security function,
   the method, comprising:
   apportioning the shared memory space between a memory area allocated to the secure application and a memory area allocated to the non-secure application, the memory area allocated to the secure application including a reserved area for the secure application;
   allocating a buffer in the memory space allocated to the non-secure application;
   loading a set of rules of access to the shared memory space into the buffer, the set of rules including a rule prohibiting writing by the non-secure application in the reserved area of the memory area allocated to the secure application;

checking, by the secure application, whether the non-secure application writes in the reserved area of the memory area allocated to the secure application according to the set of rules of access to the shared memory space;

controlling, by the first processor, access of the non-secure application to the reserved area of the memory area allocated to the secure application according to the set of rules of access to the shared memory space, wherein the secure application implements the security function to verify integrity of the reserved area of the memory area allocated to the secure application and integrity of code and data corresponding to the secure application, and the non-secure application involves a non-guaranteed level of functional security and integrity without the security function implemented in the secure application.

2. The method as claimed in claim 1, further comprising verifying integrity of the buffer and integrity of the code and of the data corresponding to the secure application.

3. The method as claimed in claim 1, further comprising constructing a security CRC (cyclic redundancy check) configured to detect errors of transmission or of transfer, the security CRC being associated with the buffer.

4. The method as claimed in claim 1, further comprising, after each operation, verifying a proper progress of a previous operation.

* * * * *